United States Patent
Morita

(10) Patent No.: US 11,689,232 B2
(45) Date of Patent: Jun. 27, 2023

(54) WIRELESS TRANSMISSION SYSTEM AND CONTROL METHOD

(71) Applicant: CANON KABUSHIKI KAISHA, Tokyo (JP)

(72) Inventor: Jun Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/504,322

(22) Filed: Oct. 18, 2021

(65) Prior Publication Data

US 2022/0131566 A1 Apr. 28, 2022

(30) Foreign Application Priority Data

Oct. 22, 2020 (JP) .............................. JP2020-177463

(51) Int. Cl.
*H04B 1/18* (2006.01)
*H04B 1/58* (2006.01)
*H04B 1/04* (2006.01)
*H04B 1/16* (2006.01)

(52) U.S. Cl.
CPC ............. *H04B 1/18* (2013.01); *H04B 1/0458* (2013.01); *H04B 1/1607* (2013.01); *H04B 1/586* (2013.01)

(58) Field of Classification Search
CPC ...... H04B 1/0458; H04B 1/1607; H04B 1/18; H04B 1/586
See application file for complete search history.

(56) References Cited

U.S. PATENT DOCUMENTS

| | | | | |
|---|---|---|---|---|
| 9,503,160 | B1 * | 11/2016 | Hyde | H04B 5/0087 |
| 2013/0070817 | A1 * | 3/2013 | McCormack | H01L 23/552 375/219 |
| 2017/0285492 | A1 * | 10/2017 | Matsuhira | G03F 7/70725 |
| 2022/0085493 | A1 * | 3/2022 | Jia | H01Q 1/243 |

FOREIGN PATENT DOCUMENTS

JP 2013149641 A 8/2013

* cited by examiner

*Primary Examiner* — Nguyen T Vo
(74) *Attorney, Agent, or Firm* — Canon U.S.A., Inc. IP Division

(57) ABSTRACT

A wireless transmission system includes a first coupler including a plurality of substrates including a signal line and a ground; and a second coupler that transmits a signal with the first coupler. A first substrate is connected to a second substrate by conductors having widths substantially equal to or less than widths of signal lines.

8 Claims, 15 Drawing Sheets

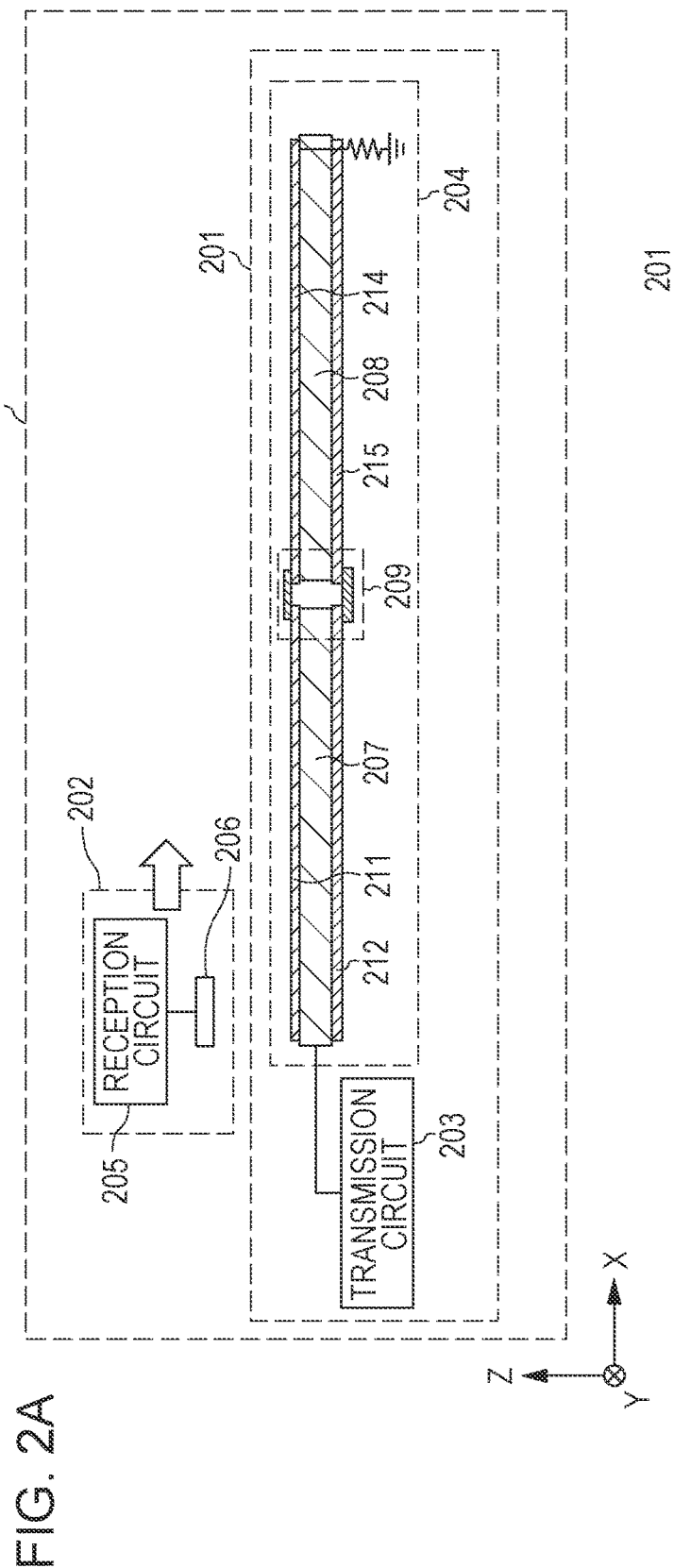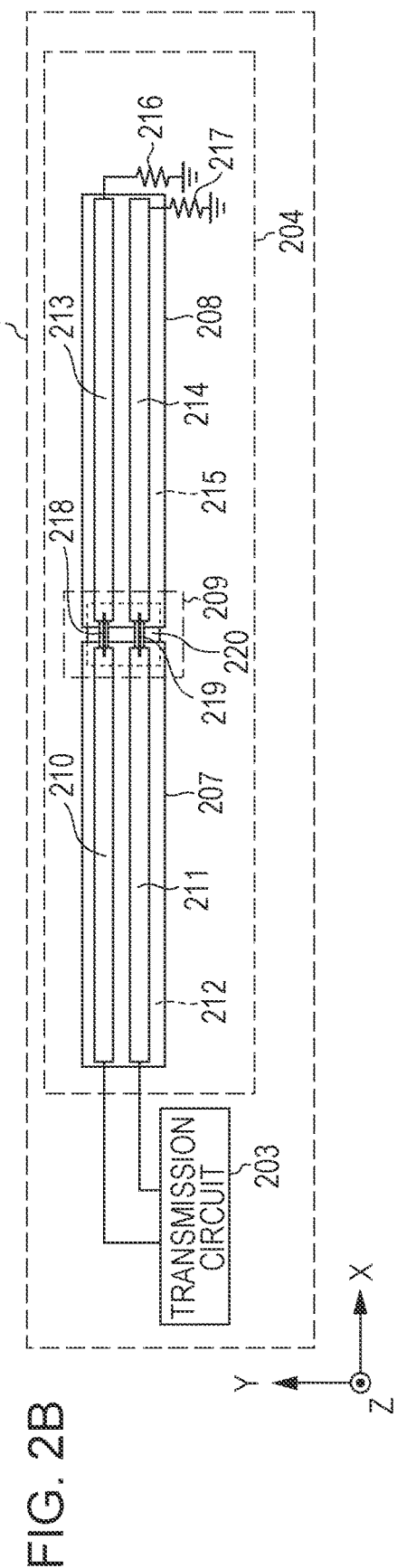

WIRELESS TRANSMISSION SYSTEM AND CONTROL METHOD

BACKGROUND

Field

The present disclosure relates to a wireless transmission system and a control method.

Description of the Related Art

In recent years, wireless transmission systems have been developed that perform wireless communication via electromagnetic and/or magnetic field coupling using couplers in proximity to each other. In such a system, communication can be performed with a baseband signal being unmodulated, thus providing a simple circuit configuration and enabling high speed and low delay communication.

A wireless transmission system using electromagnetic and/or magnetic field coupling can be constituted by a transmitter (transmission coupler) and a receiver (reception coupler). As described in Japanese Patent Laid-Open No. 2013-149641, when a plurality of substrates are connected, for example, by soldering or by conductive paste, a longer coupler (of a transmitter and receiver pair of couplers) that has a length which is equal to or more than the work size of a substrate can be fabricated.

However, if the plurality of substrates are connected regardless of the line widths and line thicknesses of and the line spaces between signal lines and/or grounds in the substrates, an impedance mismatch can be caused. In this case, ringing can occur at a connection point between the substrates, a signal waveform can be disturbed, and thus incorrect decoded data can be provided, resulting in the possibility of occurrence of communication errors.

SUMMARY

Various embodiments of the present disclosure reduce the occurrence of communication errors by appropriately connecting a plurality of substrates.

A wireless transmission system according to one embodiment of the present disclosure includes a first coupler including a plurality of substrates; and a second coupler configured to transmit a signal via electric field and/or magnetic field coupling with the first coupler. Each of the plurality of substrates includes a signal line and a ground. A first substrate included in the plurality of substrates is connected to a second substrate included in the plurality of substrates by a conductor having a width substantially equal to or less than a width of the signal line.

Furthermore, a wireless transmission system according to another embodiment of the present disclosure includes a first coupler including a plurality of substrates; and a second coupler configured to transmit a signal via electric field and/or magnetic field coupling with the first coupler. Each of the plurality of substrates includes a signal line and a ground. A first substrate included in the plurality of substrates is connected to a second substrate included in the plurality of substrates through a connector. A plurality of pins of the connector are connected to each of a signal line in the first substrate and a signal line in the second substrate.

Furthermore, a wireless transmission system according to another embodiment of the present disclosure includes a first coupler including a plurality of substrates; and a second coupler configured to transmit a signal via electric field and/or magnetic field coupling with the first coupler. A first substrate and a second substrate included in the plurality of substrates each include a signal line and a ground. A third substrate included in the plurality of substrates includes a spring contact. The first substrate and the second substrate are connected through the spring contact in the third substrate connected to respective signal lines.

Furthermore, a wireless transmission system according to another embodiment of the present disclosure includes a first coupler including a plurality of substrates; and a second coupler configured to transmit a signal via electric field and/or magnetic field coupling with the first coupler. Each of the plurality of substrates includes a signal line and a ground. A first via connected to a signal line in a first substrate included in the plurality of substrates and a second via connected to a signal line in a second substrate included in the plurality of substrates are connected through a conductor.

Further features of the present disclosure will become apparent from the following description of example embodiments with reference to the attached drawings.

BRIEF DESCRIPTION OF THE DRAWINGS

FIGS. 2A and 2B illustrate a system configuration of a wireless transmission system according to a first embodiment.

DESCRIPTION OF THE EMBODIMENTS

Figure 1A:
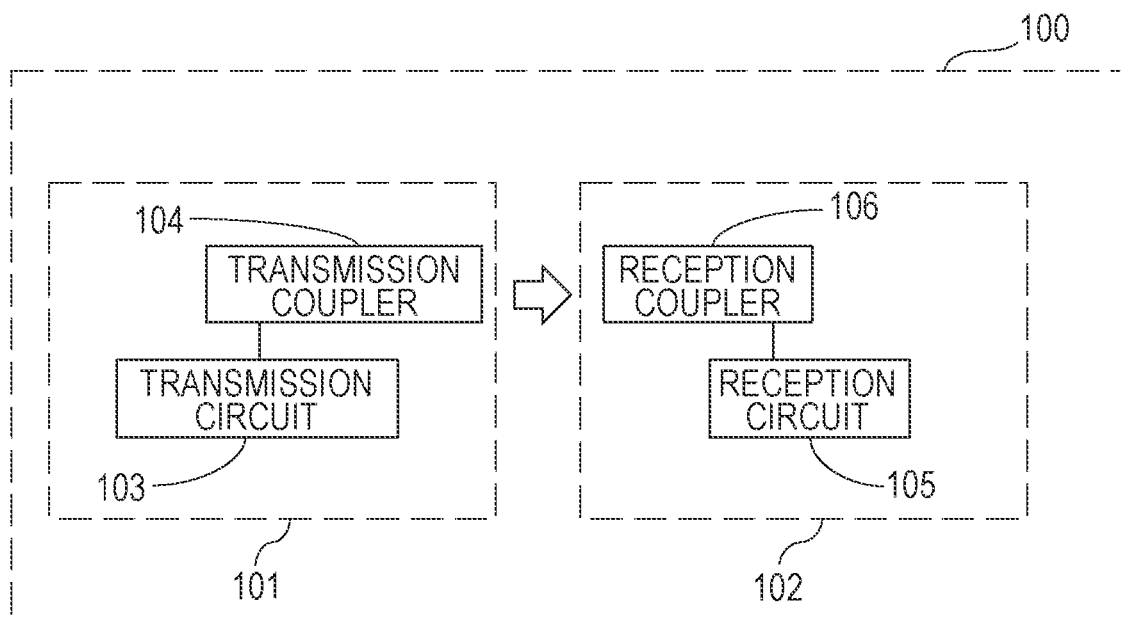
FIGS. 1A and 1B illustrate a system configuration of and a signal waveform in a wireless transmission system in related art.
Figure 1B:
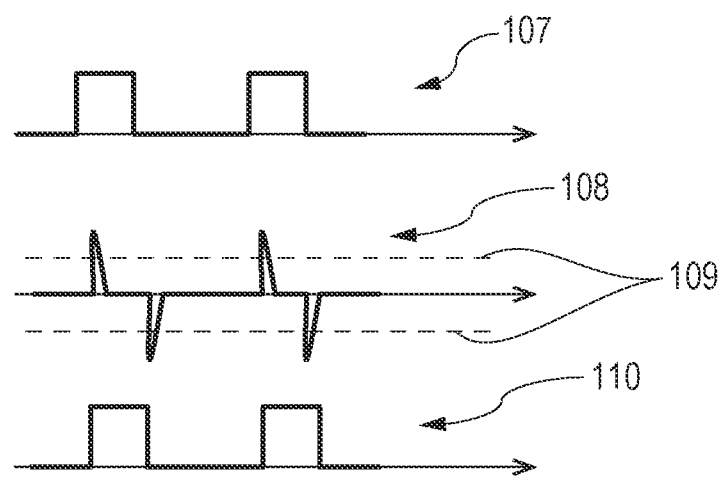

A wireless transmission system using electromagnetic and/or magnetic field coupling will be described with reference to FIGS. 1A and 1B. FIG. 1A illustrates a system configuration, and FIG. 1B illustrates a signal waveform in a wireless transmission system. As illustrated in FIG. 1A, a wireless transmission system 100 is constituted by a transmitter (transmission coupler) 101 and a receiver (reception coupler) 102. The transmitter 101 includes a transmission circuit 103 and a transmission coupler 104, and the receiver 102 includes a reception circuit 105 and a reception coupler 106. The transmitter 101 transmits, from the transmission coupler 104, a digital signal generated by the transmission circuit 103 with the digital signal being unmodulated. The receiver 102 receives, by using the reception coupler 106, the signal transmitted from the transmission coupler 104 as a derivative signal. The receiver 102 decodes the received signal by using thresholds of a comparator included in the reception circuit 105. A signal 107 illustrated in FIG. 1B is a digital signal generated by the transmission circuit 103. Furthermore, a signal 108 is a derivative signal received by the reception coupler 106. Thresholds 109 represented by dotted lines are thresholds of the comparator included in the reception circuit 105. A signal 110 is a signal decoded by the reception circuit 105.

In the above-described wireless transmission system, one coupler is long in length (hereinafter referred to as a long coupler), and the other coupler is short in length (hereinafter referred to as a short coupler). The short coupler is moved in a long side direction of the long coupler, thereby enabling wireless communication in a moving object. In the case where the long coupler is fabricated using a substrate, the length of the long coupler is limited to a certain size (the work size of the substrate) for fabrication reasons.

Thus, various embodiments of the present disclosure will be described in detail below with reference to the accompanying drawings. Incidentally, configurations described in the following embodiments are merely examples, and the present disclosure is not limited to illustrated configurations.

First Embodiment

FIGS. 2A and 2B illustrate a system configuration of a wireless transmission system 200 according to a first embodiment.

FIG. 2A illustrates a system configuration of the wireless transmission system 200 according to this embodiment in an X-Z plane. Although FIG. 2A illustrates only a configuration necessary for an explanation of this embodiment, the wireless transmission system 200 may have a function and a configuration that are not illustrated in FIG. 2A.

The wireless transmission system 200 includes a transmitter 201 and a receiver 202. The transmitter 201 includes a transmission circuit 203 and a coupler for transmission (transmission coupler) 204. The receiver 202 includes a reception circuit 205 and a coupler for reception (reception coupler) 206. In the wireless transmission system 200, a digital signal generated by the transmission circuit 203 is transmitted through the transmission coupler 204, the reception coupler 206 receives this digital signal, a signal waveform is shaped in the reception circuit 205, and thus wireless communication is performed. A transmission coupler and a reception coupler perform wireless communication via electric field and/or magnetic field coupling.

The transmission coupler 204 includes a first transmission coupler 207, a second transmission coupler 208, and a connecting unit 209 that connects the first and second transmission couplers. Although, in this embodiment, the transmission coupler 204 is constituted by two transmission couplers, the transmission coupler 204 is not limited to this configuration and may be constituted by three or more transmission couplers.

FIG. 2B illustrates a configuration of the transmitter 201 according to the first embodiment as seen in an X-Y plane.

The first transmission coupler 207 of the transmission coupler 204 includes a first signal line 210, a second signal line 211, and a first ground conductor 212. Furthermore, the second transmission coupler 208 includes a third signal line 213, a fourth signal line 214, a second ground conductor 215, a first termination resistor 216, and a second termination resistor 217. The connecting unit 209 that connects the first transmission coupler 207 and the second transmission coupler 208 includes a fifth signal line 218, a sixth signal line 219, and a third ground conductor 220.

In the transmitter 201 according to the first embodiment, each signal line is not disposed on the same face as each ground conductor, and a face on which the signal line is disposed and a face on which the ground conductor is disposed are disposed so as to be opposite each other in a Z-axis direction. The face on which the ground conductor is disposed is disposed so as to be closer to the reception coupler 206 than the face on which the signal line is disposed is.

The first signal line 210 and the third signal line 213 are electrically connected through the fifth signal line 218 by soldering. Furthermore, the second signal line 211 and the fourth signal line 214 are electrically connected through the sixth signal line 219 by soldering.

The first ground conductor 212 and the second ground conductor 215 are electrically connected through the third ground conductor 220 by soldering. One end of the first termination resistor 216 is connected to an end portion of the third signal line 213, and one end of the second termination resistor 217 is connected to an end portion of the fourth signal line 214. The other ends of both the first and second termination resistors are connected to the second ground conductor 215.

Figure 3:
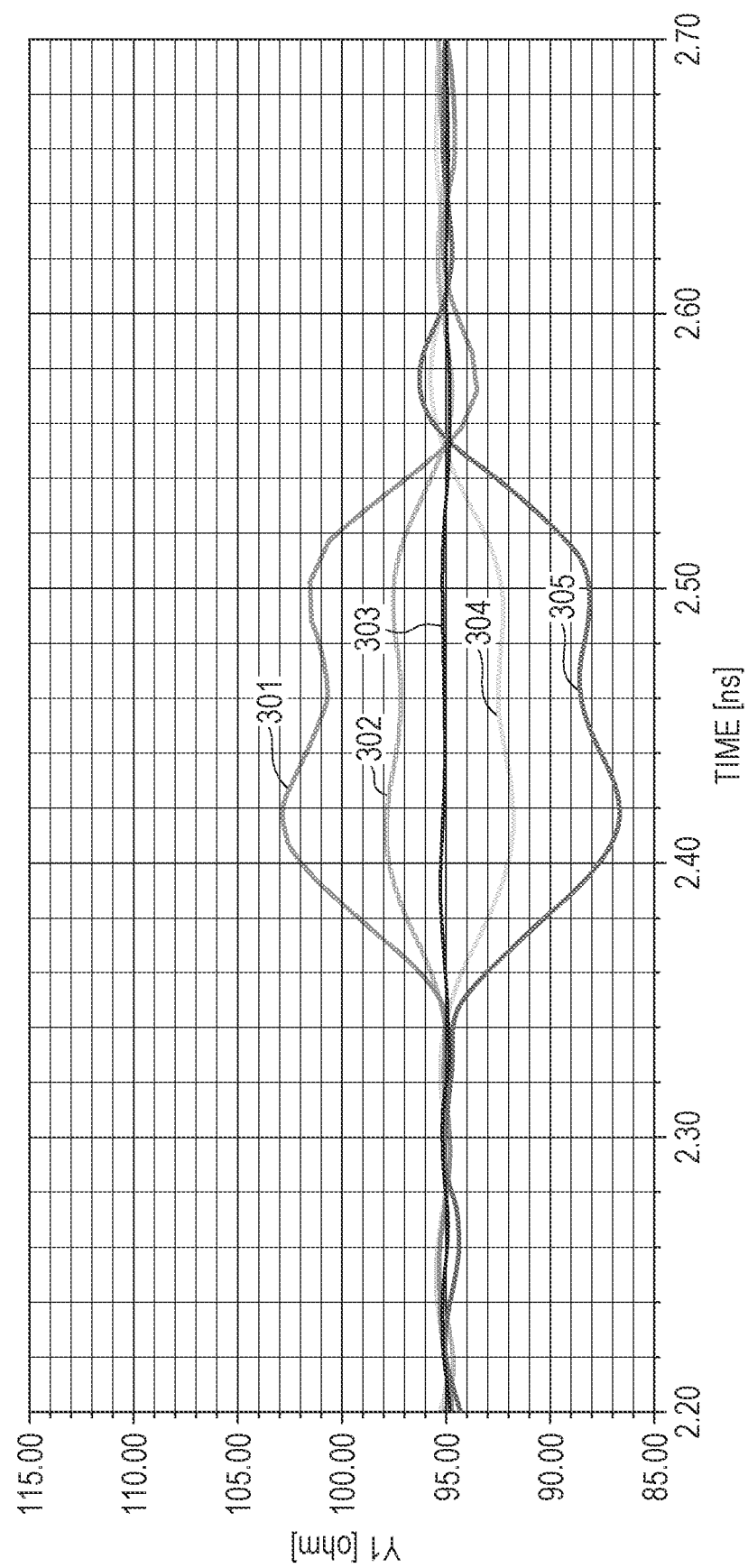
FIG. 3 illustrates simulation results of impedance of the wireless transmission system according to the first embodiment.

FIG. 3 includes graphs illustrating simulation results of impedance of the wireless transmission system 200 according to the first embodiment. Specifically, the graphs illustrate time domain reflectometry (TDR) simulation results in the first transmission coupler 207, the second transmission coupler 208, and the connecting unit 209. The vertical axis represents impedance, and the horizontal axis represents time.

The impedance of the first transmission coupler 207 is about 95Ω (in a range of from 2.2 to 2.35 ns), and the impedance of the second transmission coupler 208 is about 95Ω (in a range of from 2.6 to 2.7 ns). Incidentally, the signal line widths in a Y-axis direction of the first, second, third, and fourth signal lines in the first transmission coupler 207 and the second transmission coupler 208 are 5 mm. The impedance of the connecting unit 209 is represented in a range of from 2.35 to 2.6 ns.

In FIG. 3, impedances exhibited when the widths in the Y-axis direction of the fifth and sixth signal lines in the connecting unit 209 are 1, 3, 5, 7, and 9 mm are respectively denoted by 301, 302, 303, 304, and 305. As can be seen from a graph 303 in FIG. 3, when the line widths of the signal lines in the connecting unit 209 are 5 mm, the impedance nearly equal to those of the first and second transmission couplers is represented. Furthermore, as can be seen from a graph 302, when the line widths of the signal lines in the connecting unit 209 are 3 mm, the impedance is 97.8Ω. Additionally, as can be seen from a graph 304, when the line widths of the signal lines in the connecting unit 209 are 7 mm, the impedance is 91.8Ω. When the line widths are 3 mm and when the line widths are 7 mm, the impedances of the connecting unit 209 fall within ±5% of the impedance of 95Ω of each of the first and second transmission couplers, and thus impedance matching has been achieved in the connecting unit 209. In this case, impedance matching between each transmission coupler and the connecting unit 209 has been achieved, thus reducing the occurrence of ringing in the connecting unit 209 and reducing the occurrence of communication errors.

Meanwhile, as can be seen from a graph 301, when the line widths of the signal lines in the connecting unit 209 are 1 mm, the impedance is 103Ω. Furthermore, as can be seen from a graph 305, when the line widths of the signal lines in the connecting unit 209 are 9 mm, the impedance is 86Ω. In these cases, a slight impedance mismatch is occurring in the connecting unit 209. For this reason, there is the possibility that ringing may occur in the connecting unit 209 and communication errors may occur.

As described above, in this embodiment, when the line width of a signal line in the connecting unit 209 is set substantially equal to (within ±40% of) the line width of a signal line in the transmission coupler, the impedance mismatch is reduced, and it is apparent that the occurrence of communication errors can be reduced even if a coupler is increased in length.

Incidentally, the connecting unit 209 in this embodiment may be constituted by a flexible substrate, may be constituted by a flame retardant type 4 (FR4) substrate, or may be constituted by a Teflon (registered trademark) substrate or ceramic substrate. Alternatively, the connecting unit 209 may be a conductor that is not fabricated on a substrate.

Second Embodiment

In the wireless transmission system 200 according to the first embodiment, each signal line and each ground conductor are disposed on different faces. In a second embodiment, the wireless transmission system 200 is disclosed in which each signal line in the connecting unit 209 is disposed on the same face as the ground conductor. In this embodiment, only respects in which the second embodiment differs from the first embodiment will be described.

A configuration of the wireless transmission system 200 according to this embodiment is substantially similar to that illustrated in FIG. 2A. However, a configuration of a connecting unit 401 that connects the first transmission coupler 207 and the second transmission coupler 208 differs from that in the first embodiment.

Figure 4:
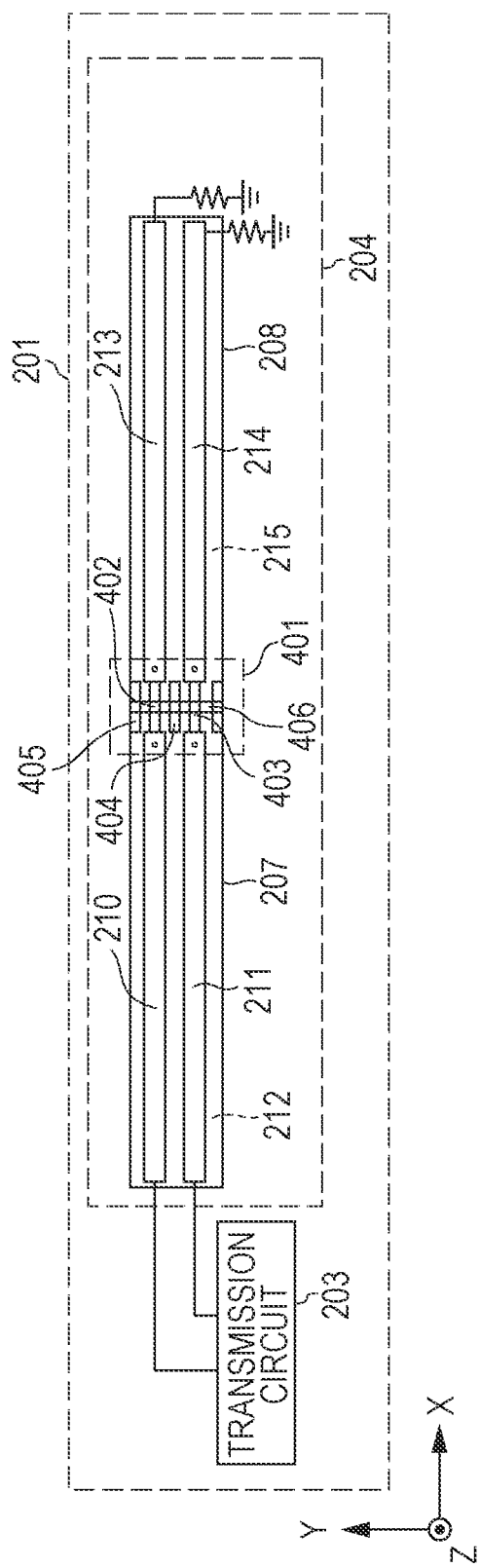
FIG. 4 illustrates a configuration of a transmitter according to a second embodiment.
Figure 5:
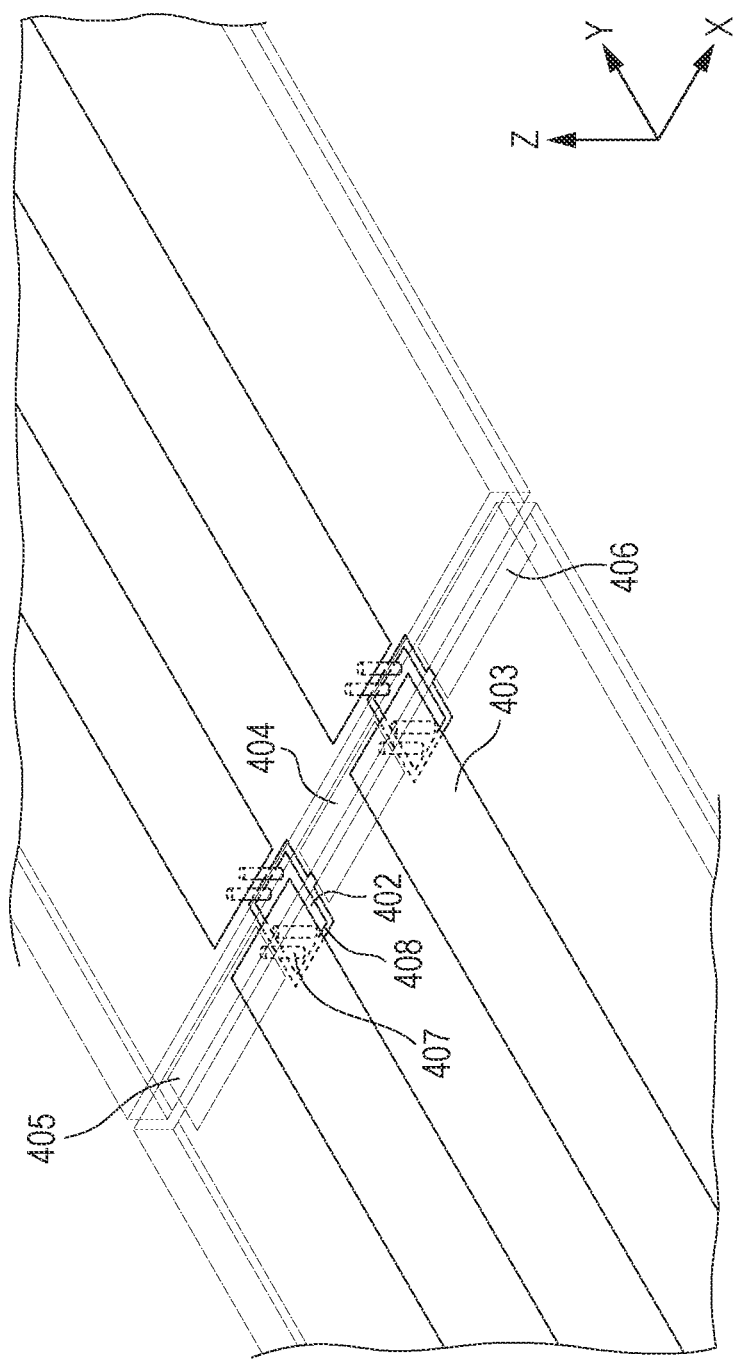
FIG. 5 illustrates a configuration of a connecting unit according to the second embodiment.

FIG. 4 illustrates a configuration of the transmitter 201 according to this embodiment. Furthermore, FIG. 5 illustrates a detailed configuration of the connecting unit 401 according to this embodiment. As illustrated in FIG. 4, the first transmission coupler 207 and the second transmission coupler 208 are connected through the connecting unit 401. The connecting unit 401 includes a seventh signal line 402, an eighth signal line 403, a fourth ground conductor 404, a fifth ground conductor 405, and a sixth ground conductor 406. Furthermore, an end portion of the first transmission coupler 207 is connected, through a via 407, to a via pad 408 disposed on the same face as each ground conductor in the connecting unit 401. In this case, one end of the first signal line 210 in the first transmission coupler 207 is connected to the seventh signal line 402 through the via 407 and the via pad 408. Similarly, the third signal line 213 in the second transmission coupler 208 is also connected to the seventh signal line 402 through a via and the via pad. In other words, the first transmission coupler 207 and the second transmission coupler 208 are connected through the seventh signal line 402.

Similarly, the second signal line 211 in the first transmission coupler 207 and the fourth signal line 214 in the second transmission coupler 208 are connected through the eighth signal line 403.

When such a system configuration illustrated in FIGS. 4 and 5 is implemented, the connecting unit 401 does not have to be disposed on a face adjacent to the reception coupler 206, and thus the reception coupler and the transmission coupler can be brought closer to each other in comparison with the first embodiment. In this case, in comparison with the system according to the first embodiment, received signal strength increases, and thus higher speed communication becomes possible.

Figure 6:
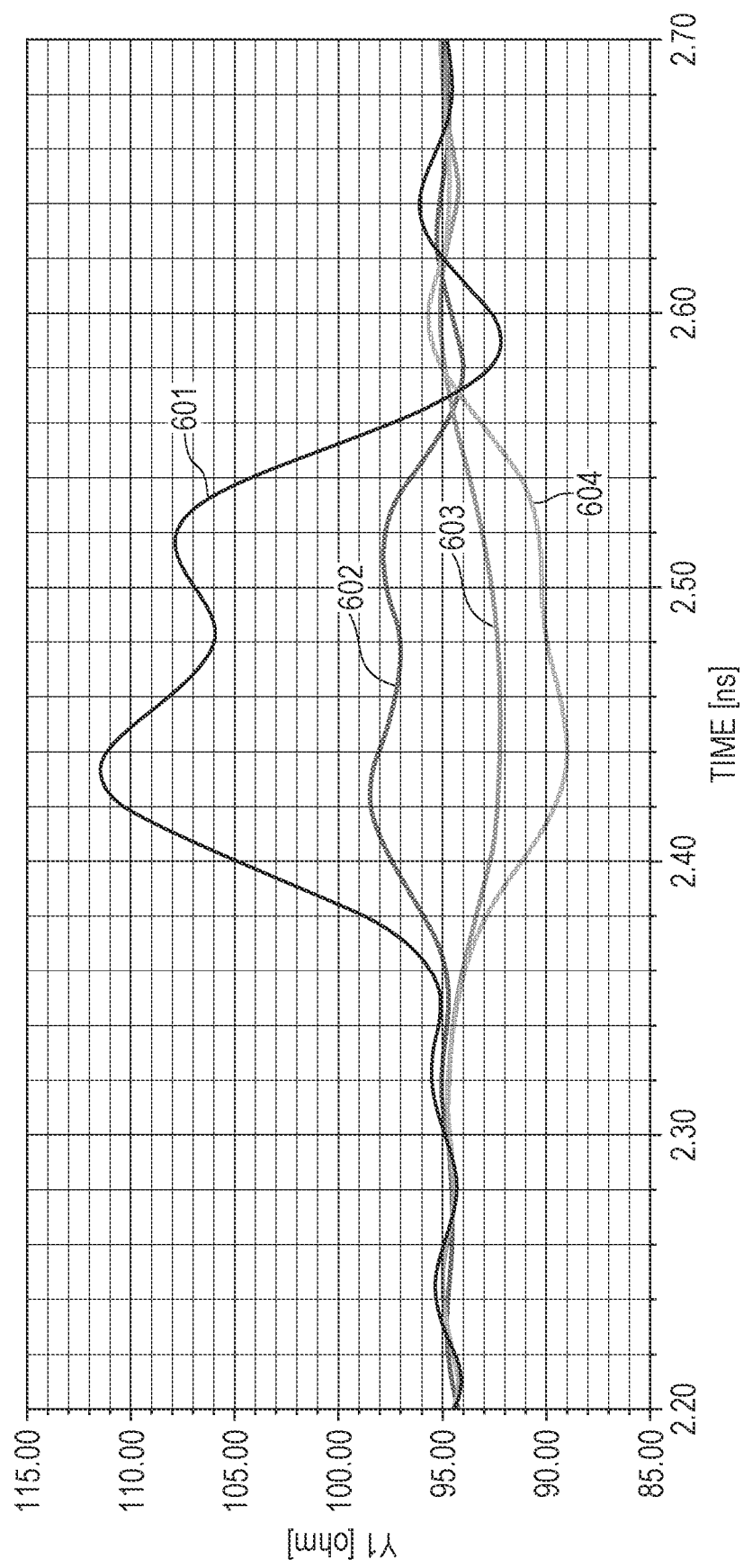
FIG. 6 illustrates simulation results of impedance of the wireless transmission system according to the second embodiment.

FIG. 6 illustrates simulation results of impedance of the wireless transmission system 200 according to the second embodiment. Specifically, there are presented graphs illustrating TDR simulation results in the first transmission coupler 207, the second transmission coupler 208, and the connecting unit 401. The vertical axis represents impedance, and the horizontal axis represents time.

The impedance of the first transmission coupler 207 is about 95Ω (in a range of from 2.2 to 2.35 ns), and the impedance of the second transmission coupler 208 is about 95Ω (in a range of from 2.6 to 2.7 ns). Incidentally, the signal line widths in the Y-axis direction of the first, second, third, and fourth signal lines in the first transmission coupler 207 and the second transmission coupler 208 are 5 mm. The impedance of the connecting unit 401 is represented in a range of from 2.35 to 2.6 ns.

Impedances exhibited when the widths in the Y-axis direction of the seventh signal line 402 and the eighth signal line 403 in the connecting unit 401 are 0.5 mm, 2.5 mm, 5 mm, and 8 mm are respectively denoted by 601, 602, 603, and 604. Incidentally, simulations are performed with distances between the seventh signal line 402 and the fourth and fifth ground conductors 404 and 405 maintained constant at 0.3 mm. Furthermore, simulations are performed with distances between the eighth signal line 403 and the fourth and sixth ground conductors 404 and 406 maintained constant at 0.3 mm.

As can be seen from graphs 602 and 603, when the line width of each signal line in the connecting unit 401 is 2.5 mm and when the line width of the signal line is 5 mm, impedances of the connecting unit 401 are 98.5Ω and 92Ω and are nearly equal to the impedance of each transmission coupler. In these cases, the impedances of the connecting unit 401 fall within ±5% of the impedance of 95Ω of the transmission coupler. Thus, when the line width of each signal line in the connecting unit 401 is 2.5 mm and when the line width of the signal line is 5 mm, impedance matching has been achieved in the connecting unit 401.

Meanwhile, as can be seen from a graph 601, when the line width of each signal line in the connecting unit 401 is 0.5 mm, the impedance of the connecting unit 401 is 111.5Ω. Furthermore, as can be seen from a graph 604, when the line width of each signal line in the connecting unit 401 is 8 mm, the impedance of the connecting unit 401 is 89Ω. In both cases, the impedances of the connecting unit 401 fall outside ±5% of the impedance of 95Ω of the transmission coupler, and a slight impedance mismatch is occurring. For this reason, there is the possibility that ringing may occur in the connecting unit 401 and communication errors may occur.

As described above, in the second embodiment, when each signal line in the connecting unit 401 is disposed on the same face as each ground conductor, impedance matching can be achieved even if the line width of the signal line in the connecting unit 401 is narrower than that in the first embodiment. Specifically, in the second embodiment, the line width of the signal line in the connecting unit 401 can be reduced to half (50%) of the line width of each signal line in the transmission coupler.

In the first transmission coupler 207 and the second transmission coupler 208, their respective characteristic impedances are determined by electromagnetic fields generated with the first ground conductor 212 and the second ground conductor 215 that are disposed on faces different from faces on which respective signal lines are disposed. In the connecting unit 401, however, since each ground conductor is disposed not on a face different from a face on which each signal line is disposed but on the same face as the signal line, when the line widths of signal lines in the connecting unit 401 and in each transmission coupler are the same, the characteristic impedance of the connecting unit is lower than that of the transmission coupler. For this reason, in the second embodiment in which a signal line and a ground conductor in the connecting unit are disposed on the same face, the line width of the signal line in the connecting unit can be thinned in comparison with the first embodiment in which a signal line and a ground conductor in the connecting unit are disposed on different faces.

Incidentally, the connecting unit 401 in this embodiment may be constituted by a flexible substrate, may be constituted by an FR4 substrate, or may be constituted by a Teflon substrate or ceramic substrate. Alternatively, the connecting unit 401 may be a conductor that is not fabricated on a substrate.

Third Embodiment

In the first and second embodiments, signal lines in the respective transmission couplers are connected by soldering of the connecting unit, which is a conductor, so that impedance matching is achieved. In a third embodiment, the wireless transmission system 200 is disclosed in which the transmission couplers are connected by using a connector. In this embodiment, only respects in which the third embodiment differs from the first and second embodiments will be described.

A configuration of the wireless transmission system 200 according to this embodiment is substantially similar to that illustrated in FIG. 2A. However, a configuration of a connecting unit 701 that connects the first transmission coupler 207 and the second transmission coupler 208 differs from those in the first and second embodiments.

Figure 7:
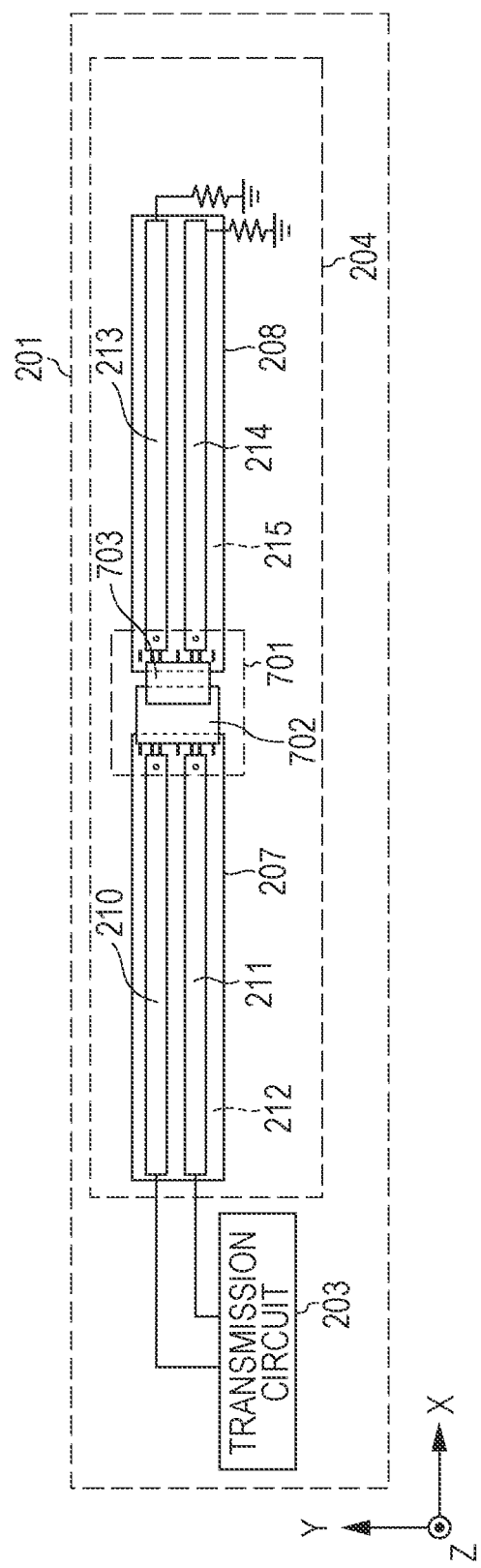
FIG. 7 illustrates a configuration of the transmitter according to a third embodiment.
Figure 8:
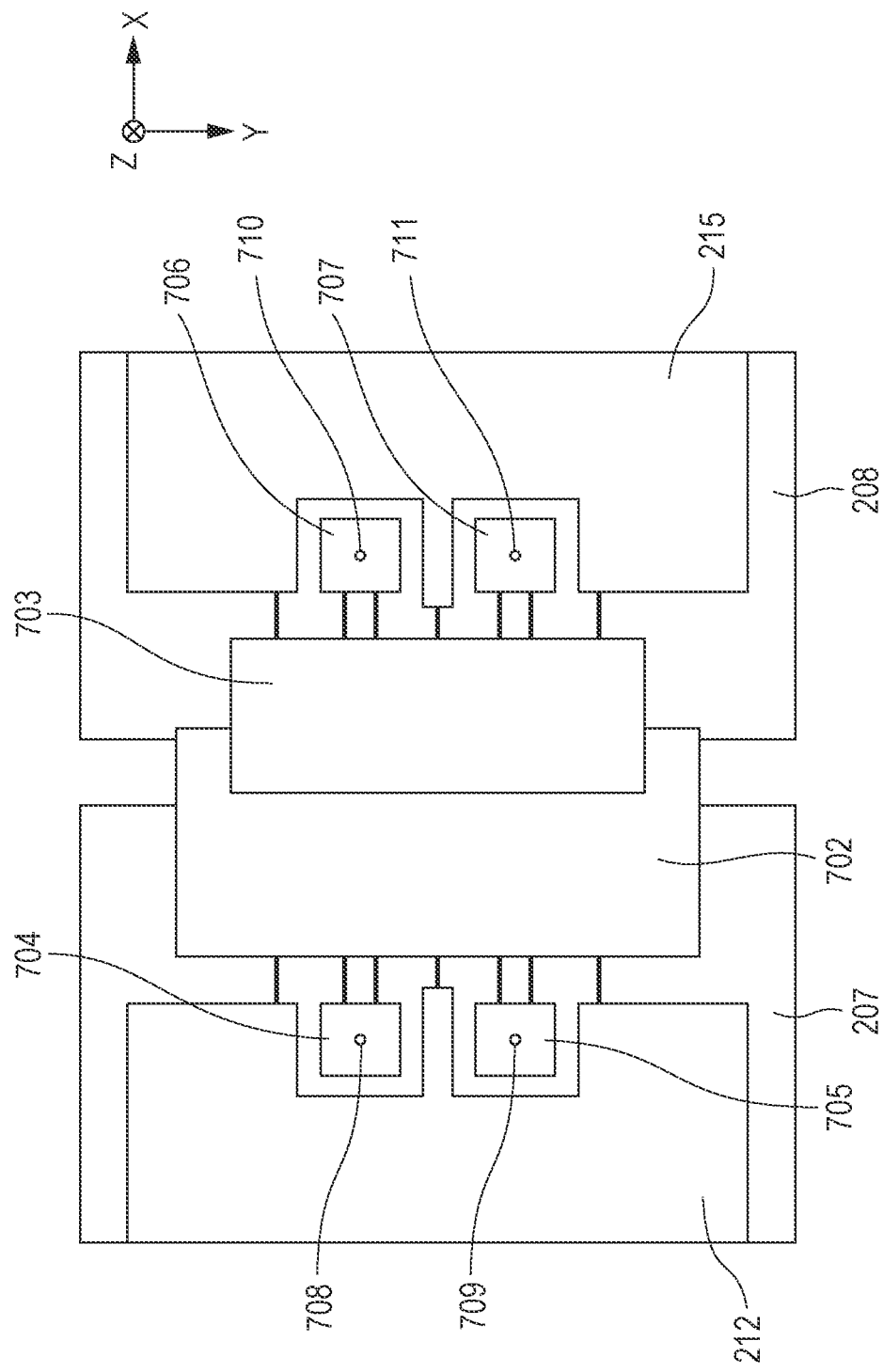
FIG. 8 illustrates a configuration of a connecting unit according to the third embodiment.

FIG. 7 illustrates a configuration of the transmitter 201 according to this embodiment. Furthermore, FIG. 8 illustrates a detailed configuration of the connecting unit 701 according to this embodiment. FIG. 8 illustrates the connecting unit 701 as seen from a back side with respect to a point of view of FIG. 7. As illustrated in FIG. 7, the first transmission coupler 207 and the second transmission coupler 208 are connected through the connecting unit 701. The connecting unit 701 includes connectors 702 and 703 including a plurality of pins. The connectors 702 and 703 have a male and female relationship with each other, and the connectors 702 and 703 are electrically connected and are mechanically fitted. Although, in this embodiment, the case is given where the number of pins in each of the connectors 702 and 703 is seven, the number of pins is not limited to this.

Pins of the connector 702 are connected to conductor patterns 704 and 705, and the first ground conductor 212. The conductor pattern 704 is connected to the second signal line 211 in the first transmission coupler 207 through a conductor via 708. The conductor pattern 705 is connected to the first signal line 210 in the first transmission coupler 207 through a conductor via 709.

Pins of the connector 703 are connected to conductor patterns 706 and 707, and the second ground conductor 215. The conductor pattern 706 is connected to the fourth signal line 214 in the second transmission coupler 208 through a conductor via 710. The conductor pattern 707 is connected to the third signal line 213 in the second transmission coupler 208 through a conductor via 711.

Table 1 indicates results of impedance measurements of the wireless transmission system 200 according to the third embodiment. Specifically, there are presented results of TDR measurements in the first transmission coupler 207, the second transmission coupler 208, and the connecting unit 701.

TABLE 1

|  | First Transmission Coupler 207 | Connecting Unit 701 | Second Transmission Coupler 208 |
| --- | --- | --- | --- |
| Condition 1 | 95 Ω | 90 to 120 Ω | 95 Ω |
| Condition 2 | 95 Ω | 93 to 108 Ω | 95 Ω |

Condition 1 refers to results of measurements with only a single pin of the connector 702 being connected to each of the conductor patterns 704 and 705 and with only a single pin of the connector 703 being connected to each of the conductor patterns 706 and 707. Condition 2 refers to results of measurements with a plurality of (two or more) pins of the connector 702 being connected to each of the conductor patterns 704 and 705 and with a plurality of (two or more) pins of the connector 703 being connected to each of the conductor patterns 706 and 707.

From the results indicated in Table 1, in a situation in which a plurality of pins are connected to each conductor pattern, an impedance difference between the connecting unit 701 and each transmission coupler is small and impedance matching has been achieved in comparison with a situation in which a single pin is connected to each conductor pattern. This is because the line width of a signal line is typically sufficiently larger than the width of a pin of a connector. For this reason, when a plurality of pins of the connector are used, the line width of the signal line is nearly equal to the sum of the widths of the plurality of pins, and impedance matching is achieved.

As described above, in the third embodiment, in the case where a plurality of transmission couplers are coupled by using a connector, when a plurality of pins of the connector are connected to a signal line in each transmission coupler, impedance matching is achieved. When impedance matching is achieved, the occurrence of communication errors is reduced.

Although, in this embodiment, each of the connectors 702 and 703 is a connector including seven pins, each connector is not limited to this. The connector only has to include twice as many pins as the number of signal lines to which the connector is connected and one pin to connect to a ground conductor. For the wireless transmission system 200 according to this embodiment, any connector including at least five or more pins only has to be provided.

Fourth Embodiment

In the third embodiment, in the wireless transmission system 200 in which transmission couplers are connected to each other through a connector, a plurality of pins of the connector are connected to a communication line in each transmission coupler, thereby achieving impedance matching. Assuming that a transmission coupler is fastened to a casing of a product, in such a configuration in the third embodiment, transmission couplers are first connected to each other by using a connector, and then the transmission couplers are fastened to the casing, for example, by using a screw or double-sided tape.

In fastening the transmission couplers to the casing through such a procedure, however, there is the possibility that a connecting unit may be detached. In a fourth embodiment, the wireless transmission system 200 is disclosed in which, for example, a coaxial cable, spring contact, or jumper pin is used in or for a connecting unit so that, after the transmission couplers are fastened to a casing, the fastened transmission couplers can be connected to each other. In this embodiment, only respects in which the fourth embodiment differs from the first to third embodiments will be described.

A configuration of the wireless transmission system 200 according to this embodiment is substantially similar to that illustrated in FIG. 2A. However, a configuration of a connecting unit that connects the first transmission coupler 207 and the second transmission coupler 208 differs from those in the first to third embodiments.

Figure 9:
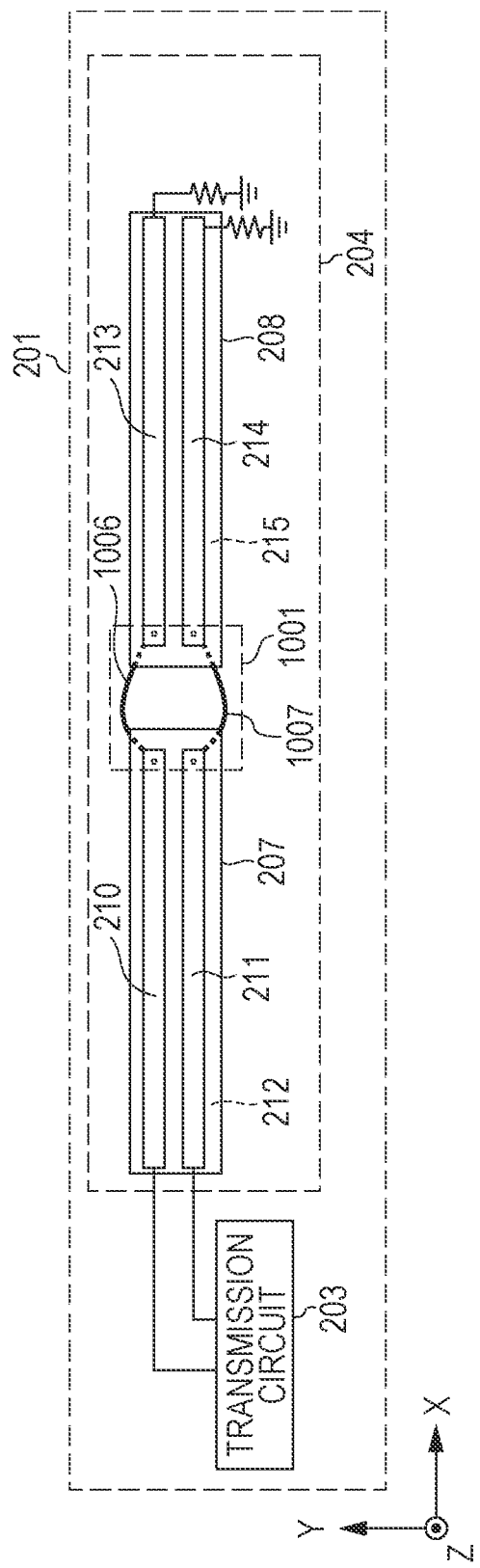
FIG. 9 illustrates a configuration of the transmitter according to a fourth embodiment.
Figure 10:
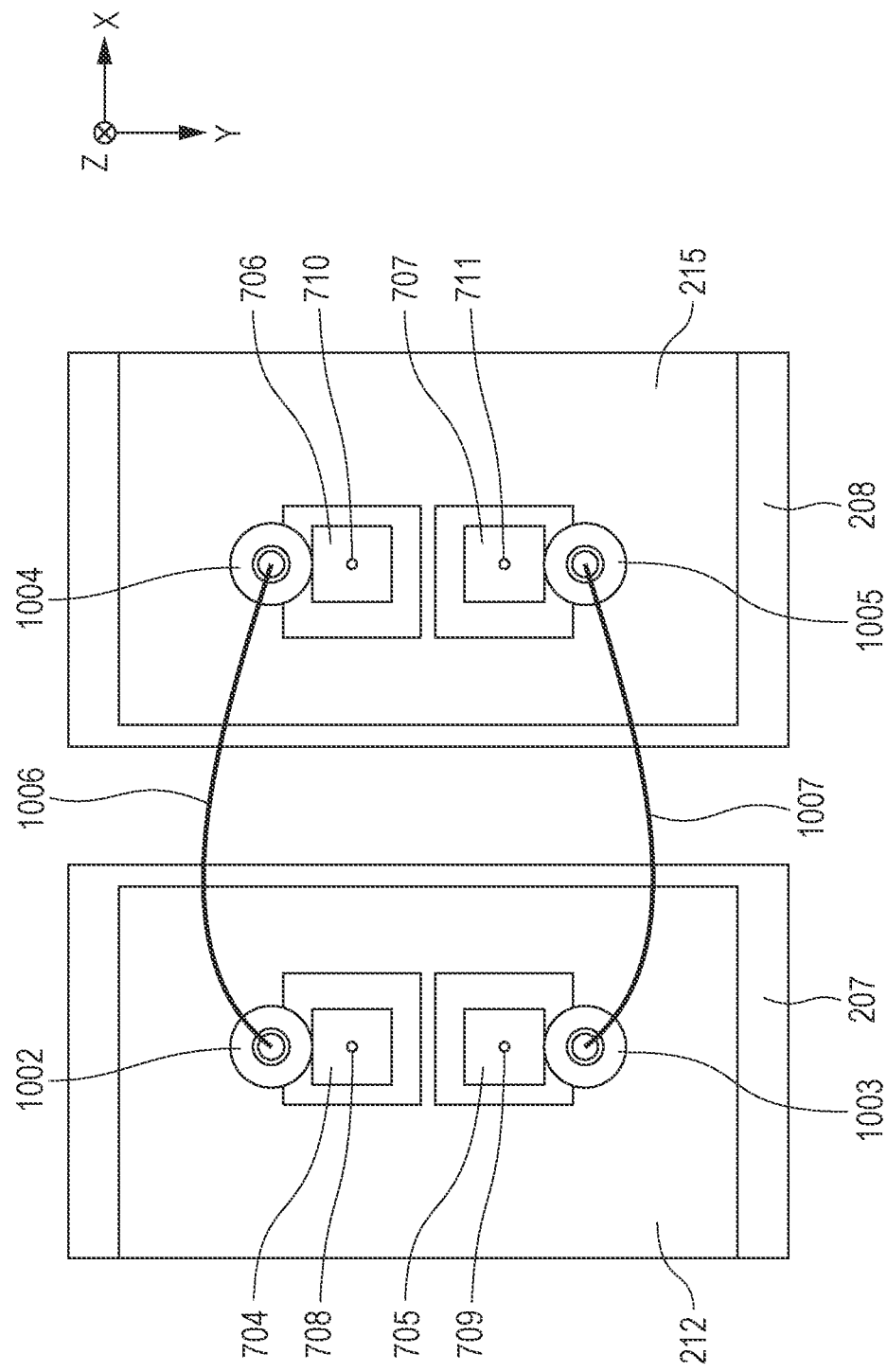
FIG. 10 illustrates a configuration of a connecting unit according to the fourth embodiment.

FIG. 9 illustrates a configuration of the transmitter 201 in which a coaxial connector is used in a connecting unit 1001. Furthermore, FIG. 10 illustrates a detailed configuration of the connecting unit 1001. FIG. 10 illustrates the connecting unit 1001 as seen from a back side with respect to a point of view of FIG. 9. Among components of the connecting unit 1001 illustrated in FIG. 10, components similar to components of the connecting unit 701 illustrated in FIG. 8 are denoted by the same reference numerals as those in FIG. 8. As illustrated in FIG. 9, the first transmission coupler 207 and the second transmission coupler 208 are connected by the connecting unit 1001 using coaxial cables 1006 and 1007.

The connecting unit 1001 includes coaxial connectors 1002, 1003, 1004, and 1005, and the coaxial cables 1006 and 1007. A core of the coaxial connector 1002 is connected to the conductor pattern 704, and a ground of the coaxial connector 1002 is connected to the first ground conductor 212. A core of the coaxial connector 1003 is connected to the conductor pattern 705, and a ground of the coaxial connector 1003 is connected to the first ground conductor 212. A core of the coaxial connector 1004 is connected to the conductor pattern 706, and a ground of the coaxial connector 1004 is connected to the second ground conductor 215. A core of the coaxial connector 1005 is connected to the conductor pattern 707, and a ground of the coaxial connector 1005 is connected to the second ground conductor 215.

The coaxial connectors 1002 and 1004 are connected by the coaxial cable 1006, and the coaxial connectors 1003 and 1005 are connected by the coaxial cable 1007. All the coaxial connectors and coaxial cables are fabricated to have an impedance of 50Ω, and a differential impedance is 100Ω. For this reason, an impedance mismatch basically does not occur in the connecting unit 1001. When the connecting unit 1001 is configured as illustrated in FIG. 10, the wireless transmission system 200 can reduce the occurrence of communication errors.

Incidentally, in place of the coaxial cables, receptacles fitted into the respective coaxial connectors 1002 to 1005 may be disposed on a substrate, and the receptacles may be connected to each other with a wiring pattern on the substrate.

Figure 11:
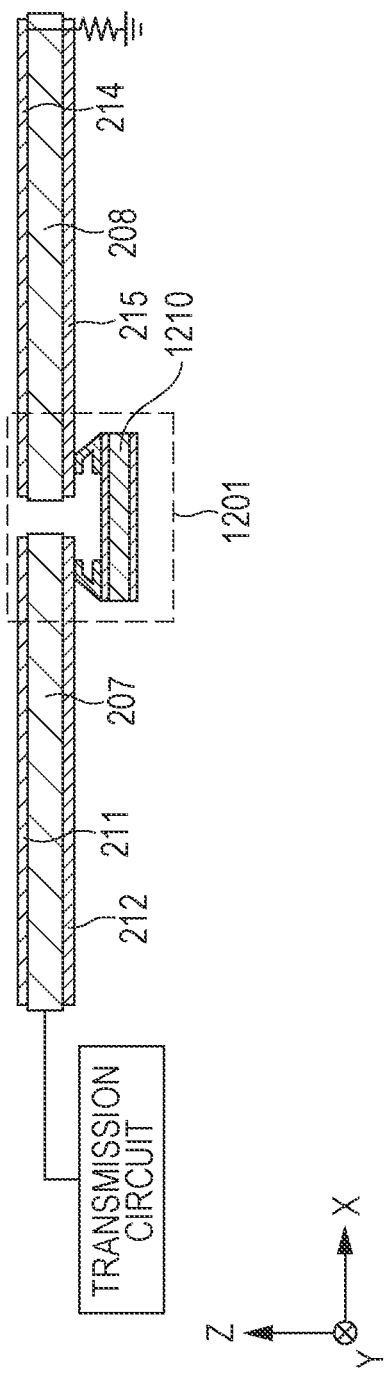
FIG. 11 illustrates another configuration of the transmitter according to the fourth embodiment.
Figure 12:
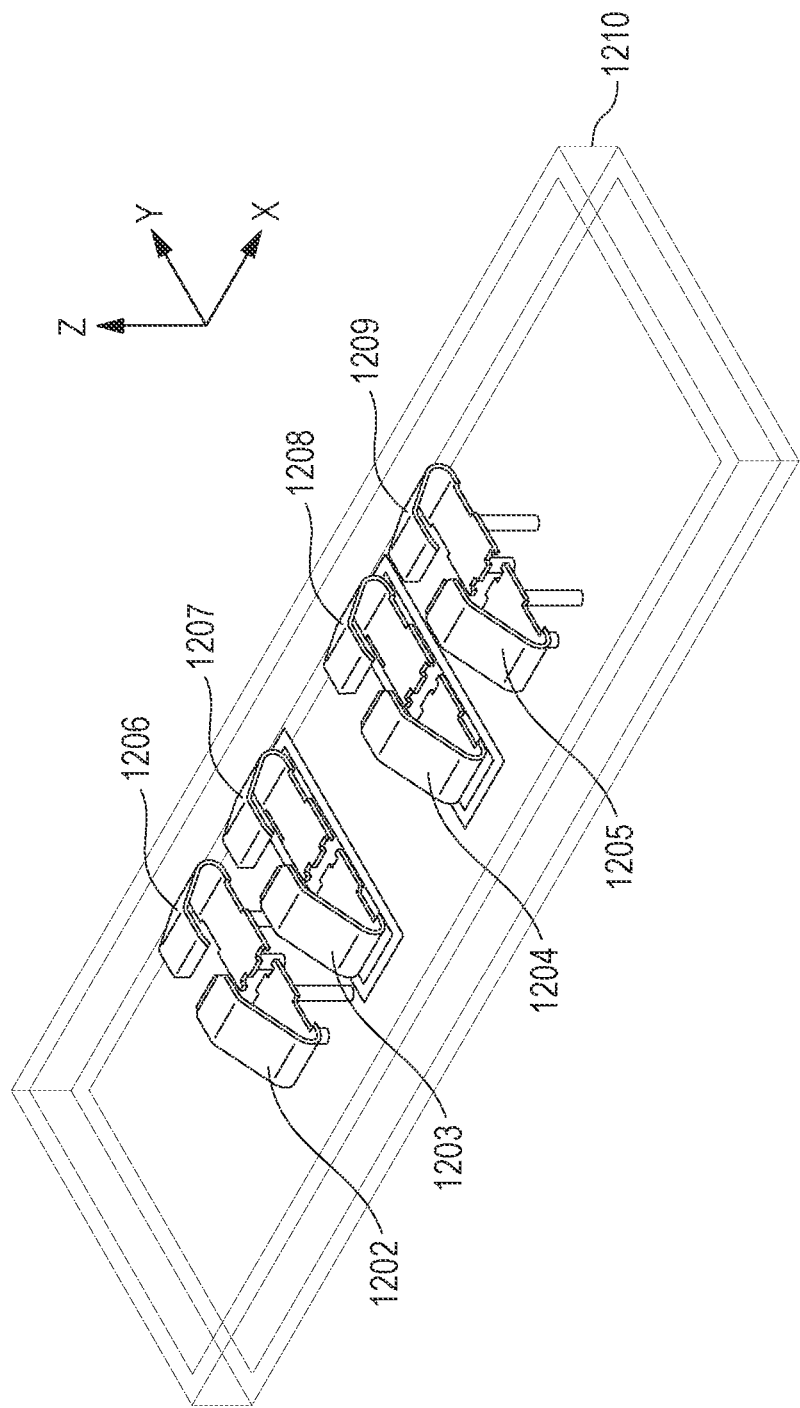
FIG. 12 illustrates a configuration of a connecting unit according to the fourth embodiment.

FIG. 11 illustrates a configuration of the transmitter 201 in which a spring contact is used for a connecting unit 1201. Furthermore, FIG. 12 illustrates a detailed configuration of the connecting unit 1201. As illustrated in FIG. 11, the first transmission coupler 207 and the second transmission coupler 208 are connected through the connecting unit 1201. The spring contact is formed on a substrate 1210. On the substrate 1210, spring contact connectors 1202, 1203, 1204, 1205, 1206, 1207, 1208, and 1209 are mounted.

In the substrate 1210, the spring contact connectors 1202 and 1206 are electrically connected to each other. Similarly, the spring contact connectors 1203 and 1207 are electrically connected to each other, the spring contact connectors 1204 and 1208 are electrically connected to each other, and the spring contact connectors 1205 and 1209 are electrically connected to each other. The spring contact connector 1203 is in contact with the conductor pattern 705. Similarly, the spring contact connector 1204 is in contact with the conductor pattern 704. Furthermore, the spring contact connectors 1207 and 1208 are respectively in contact with the conductor patterns 707 and 706. Thus, the first transmission coupler 207 and the second transmission coupler 208 are connected to each other via the spring contact.

The spring contact connectors 1202 and 1205 are in contact with the first ground conductor 212 in the first transmission coupler 207, and the spring contact connectors 1206 and 1209 are in contact with the second ground conductor 215 in the second transmission coupler 208.

The spring contact connectors 1203 and 1207 and the spring contact connectors 1204 and 1208 form lines through which signals flow on the substrate 1210. Furthermore, the spring contact connectors 1202, 1205, 1206, and 1209 connected to the ground conductors in proximity to the lines serve as a ground of paths through which signals flow, and thus differential transmission lines can be formed by the above-described eight spring contact connectors. When this spring contact has a differential impedance of 100Ω, the occurrence of a mismatch between the transmission couplers can be reduced.

Incidentally, in place of the spring contact, pieces of metal may be mounted on the substrate 1210, and the mounted pieces of metal may be brought into contact with respective conductor patterns of each transmission coupler. The shape of the metal may be a rectangular parallelepiped, circular cylinder, or polygonal prism and is not limited to these. Alternatively, a plurality of conductor patterns may be mounted on the substrate 1210, and the mounted conductor patterns may be brought into contact with respective conductor patterns of each transmission coupler.

Figure 13:
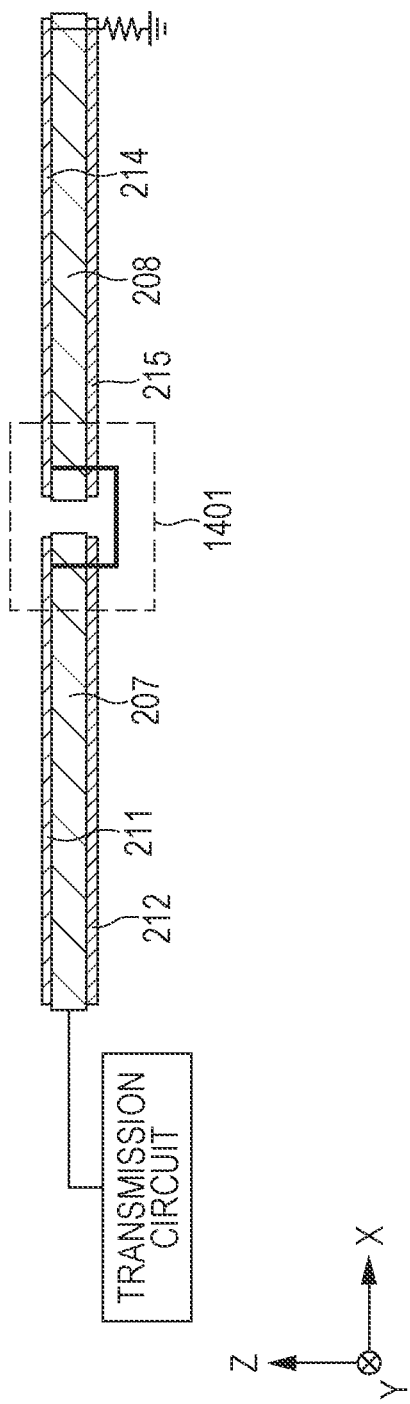
FIG. 13 illustrates another configuration of the transmitter according to the fourth embodiment.

FIG. 13 illustrates a configuration of the transmitter 201 in which a jumper pin is used in a connecting unit 1401.

Figure 14:
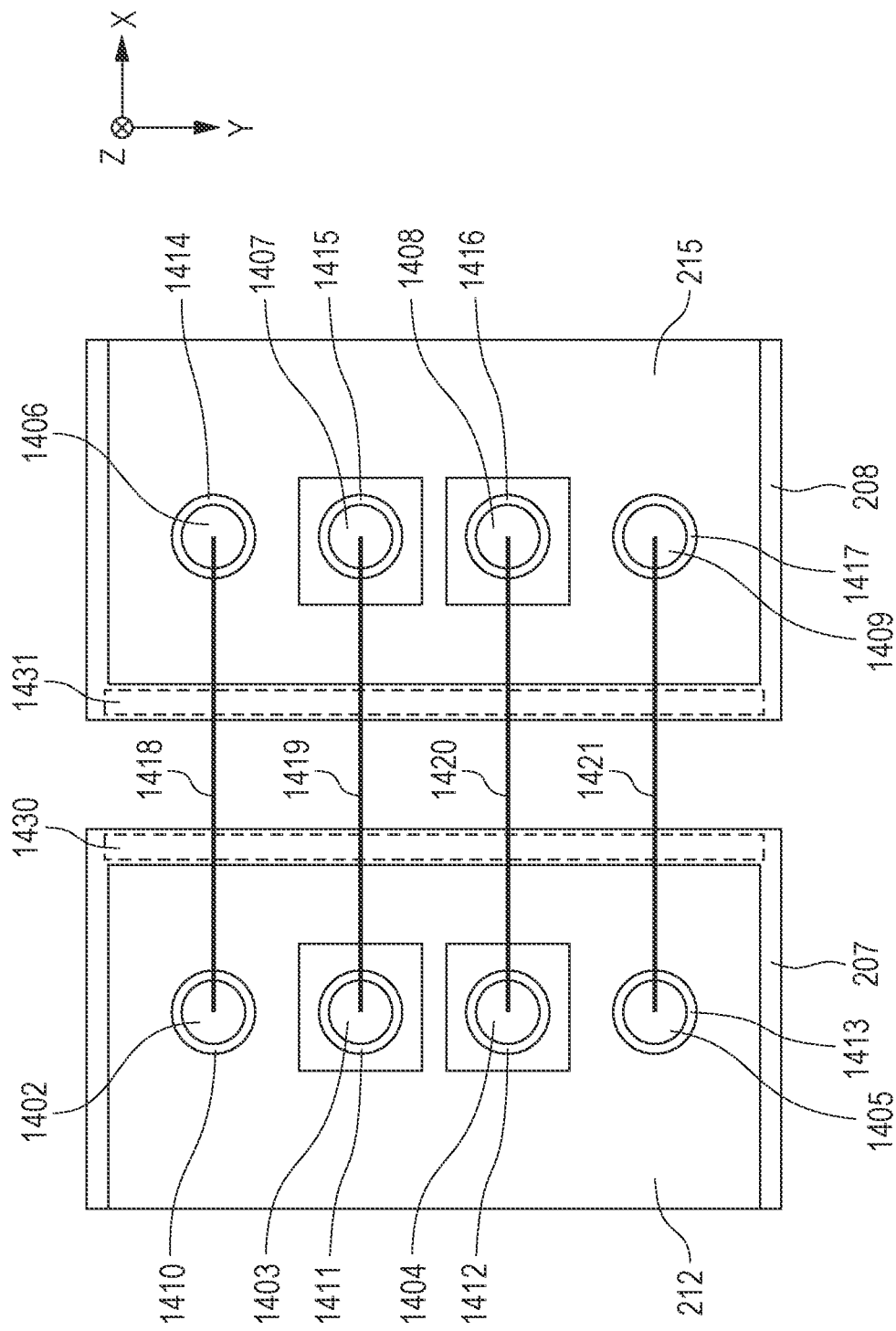
FIG. 14 illustrates a configuration of a connecting unit according to the fourth embodiment.

Furthermore, FIG. 14 illustrates a detailed configuration of the connecting unit 1401. FIG. 14 illustrates the connecting unit 1401 as seen from below with respect to a point of view of FIG. 13. As illustrated in FIG. 13, the first transmission coupler 207 and the second transmission coupler 208 are connected through the connecting unit 1401.

The connecting unit 1401 includes pin plugs 1402, 1403, 1404, 1405, 1406, 1407, 1408, and 1409, and vias 1410, 1411, 1412, 1413, 1414, 1415, 1416, and 1417. Furthermore, the connecting unit 1401 includes jumper pins 1418, 1419, 1420, and 1421. Each pin plug and a via around the pin plug are electrically connected by soldering.

The vias 1411 and 1412 are respectively connected to the second signal line 211 and the first signal line 210 in the first transmission coupler 207. The vias 1415 and 1416 are respectively connected to the fourth signal line 214 and the third signal line 213 in the second transmission coupler 208. The vias 1410 and 1413 are connected to the first ground conductor 212 in the first transmission coupler 207, and the vias 1414 and 1417 are connected to the second ground conductor 215 in the second transmission coupler 208.

The jumper pin 1418 connects the pin plugs 1402 and 1406. The jumper pin 1419 connects the pin plugs 1403 and 1407. The jumper pin 1420 connects the pin plugs 1404 and 1408. The jumper pin 1421 connects the pin plugs 1405 and 1409.

Table 2 indicates simulation results of impedance of the wireless transmission system 200 including the connecting unit 1401 illustrated in FIGS. 13 and 14. Specifically, there are presented TDR simulation results in the first transmission coupler 207, the second transmission coupler 208, and the connecting unit 1401.

TABLE 2

|  | First Transmission Coupler 207 | Connecting Unit 1401 | Second Transmission Coupler 208 |
| --- | --- | --- | --- |
| Condition 3 | 95 Ω | 88 to 133 Ω | 95 Ω |
| Condition 4 | 95 Ω | 85 to 113 Ω | 95 Ω |
| Condition 5 | 95 Ω | 85 to 122 Ω | 95 Ω |

Condition 3 indicates simulation results of impedance exhibited when the first ground conductor 212 and the second ground conductor 215 do not cover a region 1430 and a region 1431 that are illustrated in FIG. 14, respectively. In this case, the impedance of the connecting unit 1401 ranges from 88 to 133Ω, and a slight impedance mismatch between the connecting unit 1401 and each transmission coupler is occurring.

Condition 4 indicates simulation results of impedance exhibited when the first ground conductor 212 and the second ground conductor 215 are extended so as to cover the region 1430 and the region 1431, respectively. In this case, the impedance of the connecting unit 1401 ranges from 85 to 113Ω, and it is apparent that an impedance mismatch between the connecting unit 1401 and the transmission coupler has been reduced.

Figure 15:
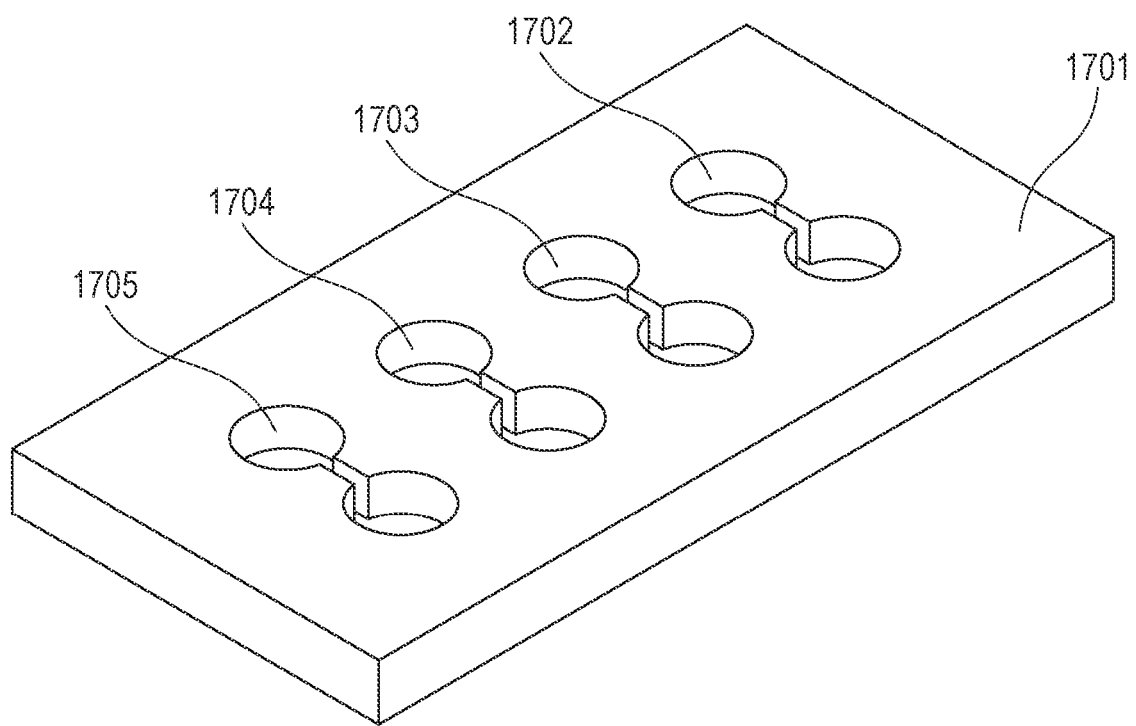
FIG. 15 illustrates a structure of a resin member according to the fourth embodiment.

Condition 5 indicates simulation results of impedance exhibited when a resin member 1701 illustrated in FIG. 15 is disposed in the connecting unit 1401. The resin member 1701 is disposed so that the jumper pins 1418, 1419, 1420, and 1421 are respectively put in holes 1702, 1703, 1704, and 1705. In this case, the impedance of the connecting unit 1401 ranges from 85 to 122Ω, and it is apparent that an impedance mismatch between the connecting unit 1401 and the transmission coupler has been reduced in comparison with the case of Condition 3.

As indicated in Table 2, it is apparent that, if a jumper pin is used in a connecting unit, when a ground conductor portion is extended or a resin member is further disposed, an impedance mismatch can be reduced.

As described in the fourth embodiment, for example, a coaxial cable, spring contact, or jumper pin can be used in or for a connecting unit between transmission couplers. In this case, for some members used in or for the connecting unit, when a configuration is improved, such as when a region of a ground conductor is extended or when another member is further used, an impedance mismatch can be reduced.

Incidentally, although, in the first to fourth embodiments, the first transmission coupler 207 and the second transmission coupler 208 serve as a coupler that performs transmission and the reception coupler 206 serves as a coupler that performs reception, transmission and reception may be interchanged. In this case, the transmission circuit and the reception circuit that are connected to the respective couplers are also interchanged.

Furthermore, although, in the first to fourth embodiments, each of the first transmission coupler 207 and the second transmission coupler 208 includes differential signal lines, each transmission coupler is not limited to this configuration and may be constituted by a single signal line.

Although, in the first to fourth embodiments, the wireless transmission system 200 includes two transmission couplers, the wireless transmission system 200 is not limited to this configuration and may include three or more transmission couplers. In this case, the wireless transmission system 200 includes a plurality of connecting units that increase in number in proportion to an increase in the number of transmission couplers.

Furthermore, each transmission coupler and the reception coupler that are disclosed in the first to fourth embodiments may be constituted by an FR4 substrate, or may be constituted by a Teflon substrate, ceramic substrate, or flexible substrate.

Furthermore, in each of the connecting units disclosed in the first to fourth embodiments, a floating pattern may be disposed in proximity to a signal line to correct impedance. Furthermore, a resistor may be incorporated between the floating pattern and a ground conductor to adjust impedance.

Incidentally, the wireless transmission system 200 disclosed in any of the first to fourth embodiments may be configured to be able to transmit power in addition to communication of wireless signals.

The present disclosure can reduce the occurrence of communication errors by appropriately connecting a plurality of substrates.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2020-177463 filed Oct. 22, 2020, which is hereby incorporated by reference herein in its entirety.

What is claimed is:

1. A wireless transmission system comprising:
a first coupler including a plurality of substrates; and
a second coupler configured to transmit a signal via electric field and/or magnetic field coupling with the first coupler,
wherein each of the plurality of substrates includes a signal line and a ground, and
wherein a first substrate included in the plurality of substrates is connected to a second substrate included in the plurality of substrates by a conductor having a width substantially equal to or less than a width of the signal line.

2. The wireless transmission system according to claim 1, further comprising
a ground conductor disposed on a face different from a face on which the conductor is disposed,
wherein the width of the conductor is not more than +40% and not less than −40% with respect to the width of the signal line.

3. The wireless transmission system according to claim 1, further comprising
a ground conductor disposed on a same face as the conductor,
wherein the width of the conductor is not more than 100% and not less than −50% with respect to the width of the signal line.

4. A wireless transmission system comprising:
a first coupler including a plurality of substrates; and
a second coupler configured to transmit a signal via electric field and/or magnetic field coupling with the first coupler,
wherein each of the plurality of substrates includes a signal line and a ground, and
wherein a first via connected to a signal line in a first substrate included in the plurality of substrates and a second via connected to a signal line in a second substrate included in the plurality of substrates are connected through a conductor.

5. The wireless transmission system according to claim 4, wherein the conductor is a coaxial cable.

6. The wireless transmission system according to claim 4, wherein the conductor is a jumper pin.

7. A control method for a wireless transmission system,
wherein the wireless transmission system includes a first coupler including a plurality of substrates including a signal line and a ground, and a second coupler, and a first substrate included in the plurality of substrates is connected to a second substrate included in the plurality of substrates by a conductor having a width substantially equal to or less than a width of the signal line, and
wherein the control method comprises, with the first coupler and the second coupler, transmitting a signal via electric field and/or magnetic field coupling.

8. A control method for a wireless transmission system,
wherein the wireless transmission system includes a first coupler including a plurality of substrates including a signal line and a ground, and a second coupler, and a first via connected to a signal line in a first substrate included in the plurality of substrates and a second via connected to a signal line in a second substrate included in the plurality of substrates are connected through a conductor, and
wherein the control method comprises, with the first coupler and the second coupler, transmitting a signal via electric field and/or magnetic field coupling.

* * * * *